US010108981B2

(12) United States Patent
Kobori et al.

(10) Patent No.: US 10,108,981 B2
(45) Date of Patent: Oct. 23, 2018

(54) CONTROLLING CONTENT DISTRIBUTION USING MULTIPLE DEVICES

(71) Applicant: Sony Corporation, Tokyo (JP)

(72) Inventors: Ikuo Kobori, Tokyo (JP); Yoshio Tsuda, Kanagawa (JP); Masato Kawada, Tokyo (JP); Kensuke Onuma, Tokyo (JP); Eiji Miyakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 338 days.

(21) Appl. No.: 14/165,950

(22) Filed: Jan. 28, 2014

(65) Prior Publication Data
US 2014/0222579 A1 Aug. 7, 2014

(30) Foreign Application Priority Data

Feb. 6, 2013 (JP) .................................. 2013-021409

(51) Int. Cl.
G06Q 30/02 (2012.01)
(52) U.S. Cl.
CPC ..... G06Q 30/0251 (2013.01); G06Q 30/0241 (2013.01)
(58) Field of Classification Search
CPC .............. G06Q 30/00; G06Q 30/0241; G06Q 30/0251; G06Q 30/0267
USPC .......................................... 370/312; 715/719
See application file for complete search history.

(56) References Cited

U.S. PATENT DOCUMENTS

2008/0240010 A1* 10/2008 Vasudevan ............. G06Q 30/02 370/312
2012/0013770 A1 1/2012 Stafford et al.
2012/0303442 A1 11/2012 Patwa et al.
2014/0331135 A1* 11/2014 Sukoff .................... H04L 65/60 715/719

FOREIGN PATENT DOCUMENTS

EP 2028659 A2 2/2009
EP 08252732.6 A2 2/2009

(Continued)

OTHER PUBLICATIONS

Japanese Office Action dated Apr. 21, 2015 in patent application No. 2013-021409.

(Continued)

Primary Examiner — Marilyn G Macasiano
(74) Attorney, Agent, or Firm — Chip Law Group

(57) ABSTRACT

There is provided an information processing apparatus including a first advertisement management part configured to manage an output of first advertisement content from a first device, a second advertisement management part configured to manage an output of second advertisement content from a second device, the second device being different from the first device, the second advertisement content being related to the first advertisement content, and a linked output controller configured to control, based on first information acquired by the first advertisement management part from the first device and linked output setting information defining an operation of the second advertisement content in association with the first information, the output of the second advertisement content from the second device through the second advertisement management part.

15 Claims, 16 Drawing Sheets

(56) References Cited

FOREIGN PATENT DOCUMENTS

| | | |
|---|---|---|
| JP | 2007-115260 A | 5/2007 |
| JP | 2008-306407 A | 12/2008 |
| JP | 2010-176648 A | 8/2010 |
| WO | 2012009164 A1 | 1/2012 |

OTHER PUBLICATIONS

European Search Report from EP Application No. 14152978, dated May 14, 2014.

* cited by examiner

CONTROLLING CONTENT DISTRIBUTION USING MULTIPLE DEVICES

CROSS REFERENCE TO RELATED APPLICATIONS

This application claims the benefit of Japanese Priority Patent Application JP 2013-021409 filed Feb. 6, 2013, the entire contents of which are incorporated herein by reference.

BACKGROUND

The present disclosure relates to an information processing apparatus, an information processing method, and a program.

It is already in widespread use to distribute advertisement content to a device through a network. For example, on a web page being browsed by a user, an advertisement related to contents of the web page is generally displayed. Advanced functions of devices and speeding up of the network have increased rich and appealing pieces of advertisement content containing moving images and the like. JP 2008-306407A describes an example of technology for displaying such pieces of advertisement content.

SUMMARY

The number of devices to which pieces of advertisement content are to be distributed has recently been increasing, since the portability of the devices enhanced and network communication functions are added to various types of devices. Further, the number of scenes is also increasing where there are multiple such devices around a user. For example, there are a scene in which the user has multiple devices at home and a scene in which multiple users each carrying a device gather together. However, no technology is sufficiently proposed yet for leading such situations to the achievement of distribution of more appealing advertisement content.

In light of the foregoing, it is desirable in the present disclosure to provide an information processing apparatus, an information processing method, and a program, which are novel and improved, and which are capable of achieving an expression of advertisement content that is more appealing by using multiple devices.

According to an embodiment of the present disclosure, there is provided an information processing apparatus which includes a first advertisement management part configured to manage an output of first advertisement content from a first device, a second advertisement management part configured to manage an output of second advertisement content from a second device, the second device being different from the first device, the second advertisement content being related to the first advertisement content, and a linked output controller configured to control, based on first information acquired by the first advertisement management part from the first device and linked output setting information defining an operation of the second advertisement content in association with the first information, the output of the second advertisement content from the second device through the second advertisement management part.

According to another embodiment of the present disclosure, there is provided an information processing method which includes managing an output of first advertisement content from a first device, managing an output of second advertisement content from a second device, the second device being different from the first device, the second advertisement content being related to the first advertisement content, and controlling, based on first information acquired from the first device and linked output setting information defining an operation of the second advertisement content in association with the first information, the output of the second advertisement content from the second device.

According to another embodiment of the present disclosure, there is provided a program for causing a computer to achieve a function of managing an output of first advertisement content from a first device, a function of managing an output of second advertisement content from a second device, the second device being different from the first device, the second advertisement content being related to the first advertisement content, and a function of controlling, based on first information acquired from the first device and linked output setting information defining an operation of the second advertisement content in association with the first information, the output of the second advertisement content from the second device.

A display of advertisement content on a first terminal and a display of advertisement content on a second terminal are linked with each other in accordance with linked output setting information set in advance, and thus, there can be achieved an expression of the advertisement content that is different from the case of the advertisement content being output from a single device, and that is unique to the case of the advertisement content being output from the multiple devices.

According to one or more of embodiments of the present disclosure, an expression of the advertisement content that is more appealing can be achieved by using multiple devices.

DETAILED DESCRIPTION OF THE EMBODIMENT(S)

Figure 1A:
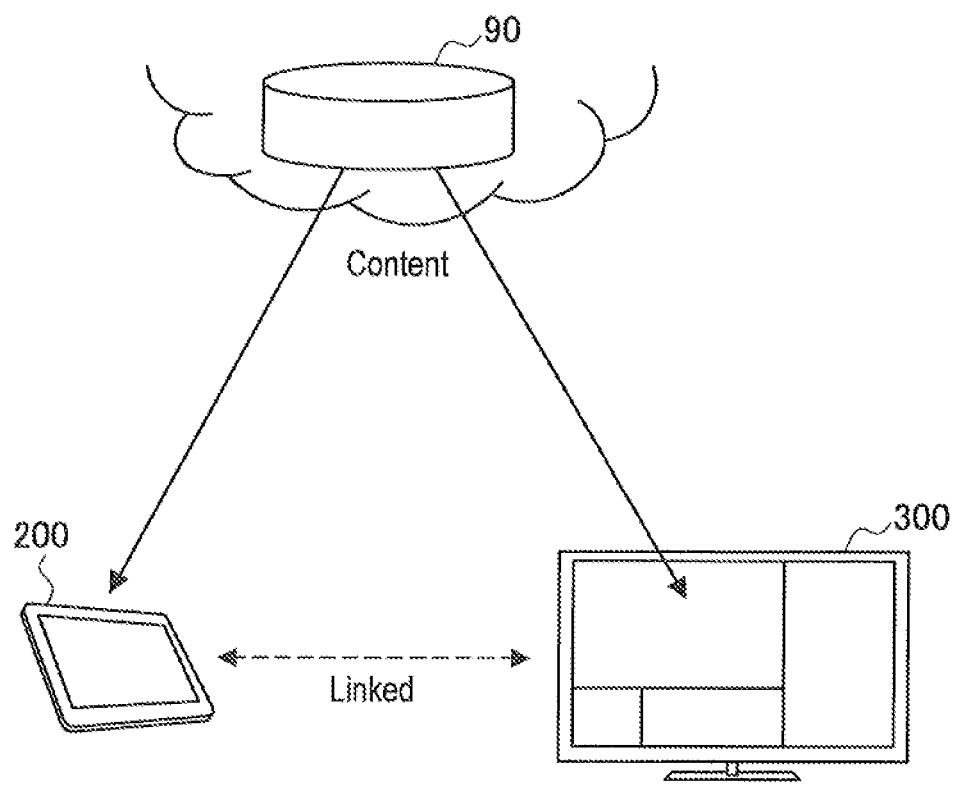
FIG. 1A is a diagram showing a state before advertisement distribution in a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First embodiment (example of linking between tablet terminal and TV)
2. Second embodiment (another example of linking between tablet terminal and TV)
3. Third embodiment (example of linking between terminals)
4. Fourth embodiment (another example of linking between terminals)
5. Fifth embodiment (example of linking between tablet terminal and electronic billboard)
6. Hardware configuration
7. Supplement 1. First Embodiment (1-1. Overview)

Figure 1B:
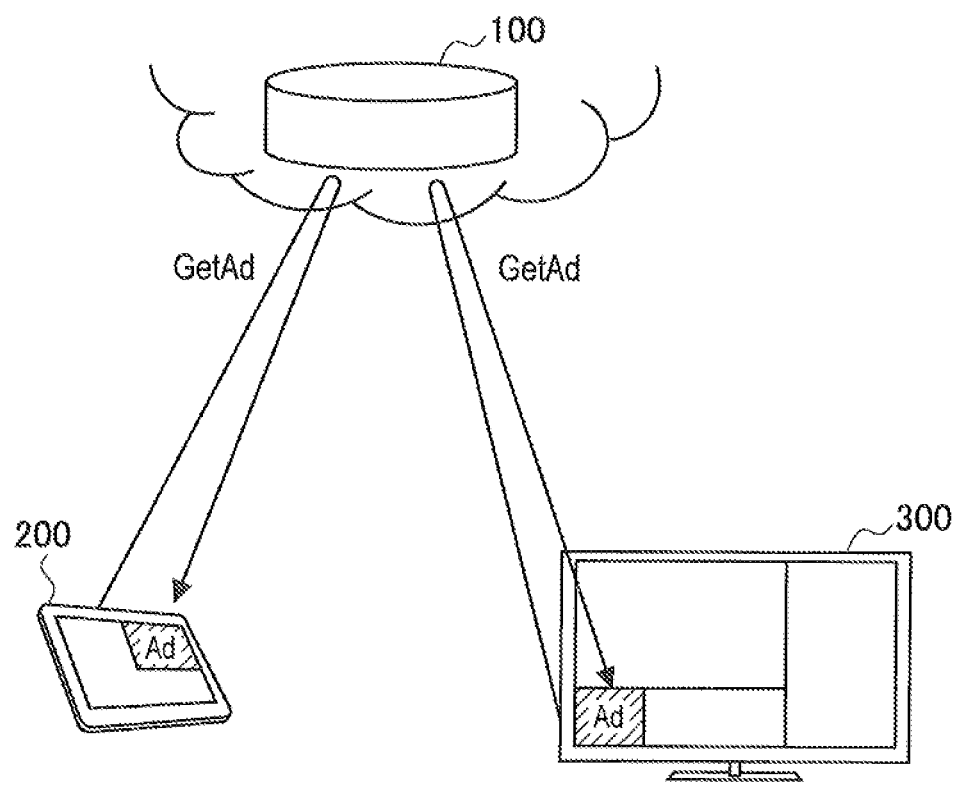
FIG. 1B is a diagram showing a state during advertisement distribution in the first embodiment of the present disclosure.
Figure 1C:
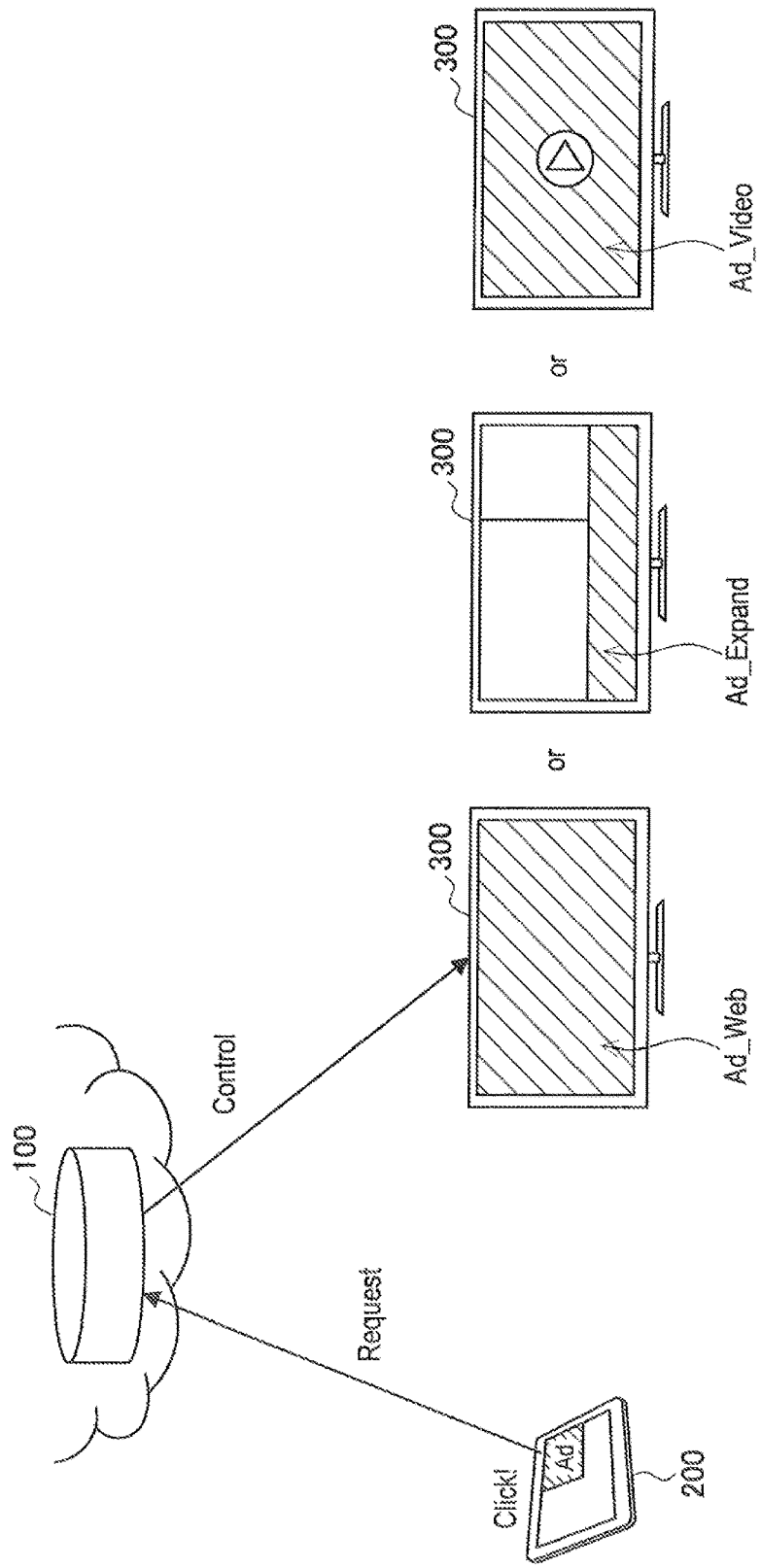
FIG. 1C is a diagram showing a state during advertisement linking in the first embodiment of the present disclosure.

FIGS. 1A to 1C are each a diagram schematically showing a first embodiment of the present disclosure. FIG. 1A shows a state before advertisement distribution in the present embodiment. Here, a content server 90 distributes content to each of a tablet terminal 200 and a TV 300. For example, the tablet terminal 200 may be used for browsing content of related information of broadcast content viewed on the TV 300.

FIG. 1B shows a state during advertisement distribution in the present embodiment. In the case where the tablet terminal 200 and the TV 300 each transmit an advertisement acquisition request (GetAd) to an advertisement server 100, pieces of advertisement content (Ad) are distributed to the tablet terminal 200 and the TV 300, respectively. The advertisement acquisition request is transmitted by an advertisement application executed in common by the tablet terminal 200 and the TV 300, for example.

Here, the advertisement server 100 may be the same server as or a different server from the content server 90. It should be noted that the advertisement server 100 recognizes that the tablet terminal 200 and the TV 300 are used in cooperation with each other, and distributes pieces of advertisement content for a linked display, which will be described later, to the tablet terminal 200 and the TV 300, respectively. In the case where the advertisement server 100 and the content server 90 are different servers, the content server 90 notifies the advertisement server 100 of usage states of such tablet terminal 200 and TV 300.

The pieces of advertisement content (Ad) distributed to the tablet terminal 200 and the TV 300, respectively, are displayed on the respective screens of the tablet terminal 200 and the TV 300. In the example shown in the figure, the advertisement content is displayed on the tablet terminal 200 at the top right of the screen and the advertisement content is displayed on the TV 300 at the bottom left of the screen. Note that it is not necessary that the advertisement content be displayed simultaneously with the distribution. That is, the distribution of the advertisement content may be executed at a background of broadcast content viewing.

Here, the advertisement content (Ad) distributed to the tablet terminal 200 and the advertisement content (Ad) distributed to the TV 300 are related to each other, for example, the pieces of advertisement content may correspond to the same advertisement target. The subject items of the pieces of advertisement content may be the same or different from each other. For example, an image in advertisement content may be divided and the divided image pieces may be distributed to the tablet terminal 200 and the TV 300. In this case, the advertisement content on the tablet terminal 200 is displayed in conjunction with the advertisement content on the TV 300, and thus, a series of image pieces is displayed over the tablet terminal 200 and the TV 300, which makes it easier for the advertisement to attract user's attention.

FIG. 1C shows a state during advertisement linking in the present embodiment. In the present embodiment, the tablet terminal 200 and the TV 300 each display advertisement content (Ad), and when a user operation (Click!) is given to the advertisement content in the tablet terminal 200, the display of the advertisement content on the TV 300 changes. In the example shown in the figure, on that occasion, a web page of the advertiser is displayed (Ad_Web), a display area of the advertisement content on the screen is expanded (Ad_Expand), or a video serving as the advertisement content is displayed (Ad_Video).

The change of the display of the advertisement content on the TV 300 is achieved as follows: the tablet terminal 200 which has received a user operation transmits an advertisement control request (Request) to the advertisement server 100; and, in response, the advertisement server 100 controls (Control) the display of the advertisement content on the TV 300. Note that the advertisement control request to be transmitted may not necessarily be an explicit request, and may be contents of the user operation as they are, for example. The display on the TV 300 after the change is executed on the basis of contents of the display in display areas having different sizes, an address of a web site, video content, and the like. Those pieces of information or data may be included in the advertisement content distributed during the advertisement distribution, or may be additionally distributed with a control signal from the advertisement server 100.

(1-2. Functional Configuration)

Figure 2:
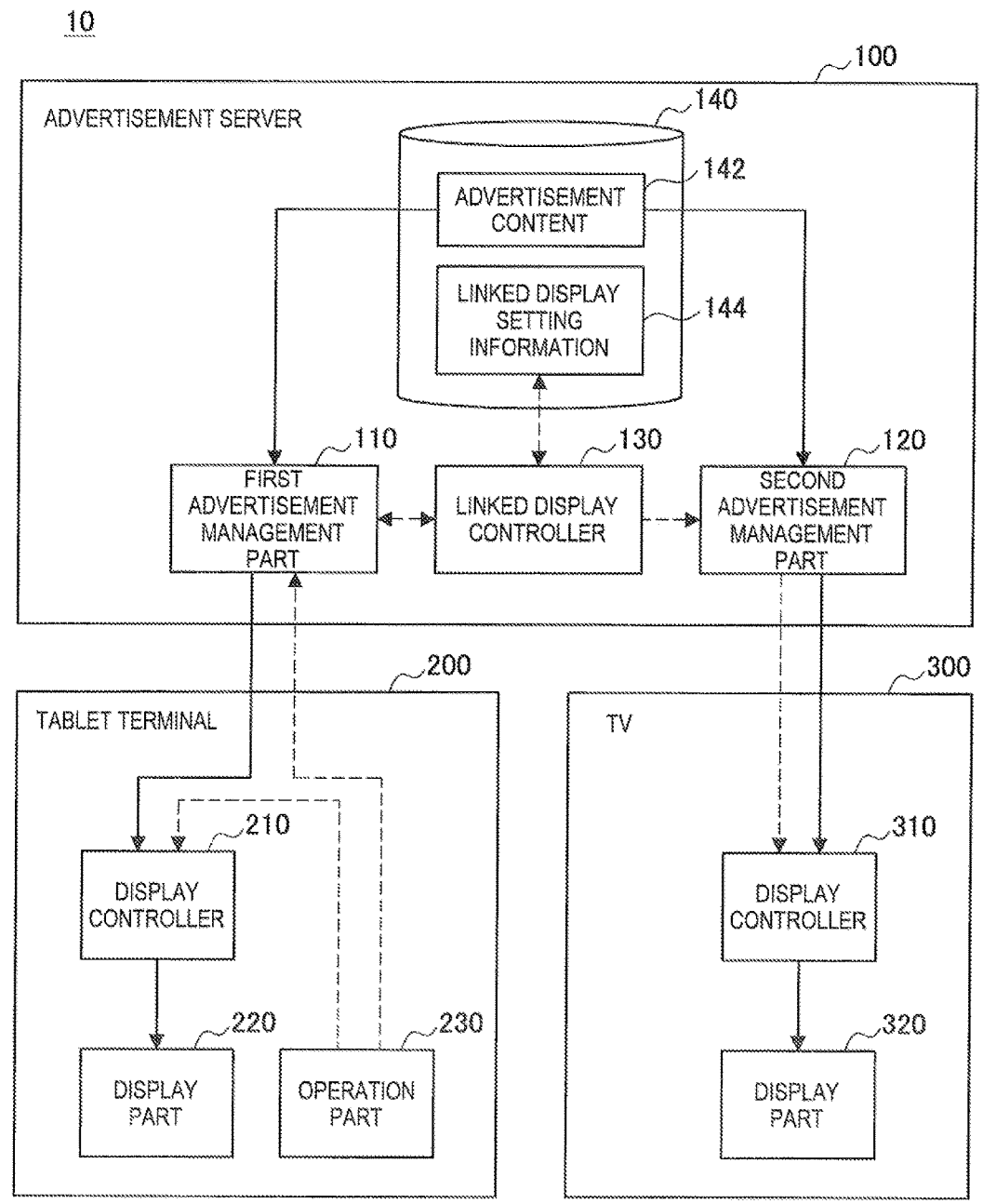
FIG. 2 is a block diagram schematically showing a functional configuration of the first embodiment of the present disclosure.

FIG. 2 is a block diagram schematically showing a functional configuration of the first embodiment of the present disclosure. Referring to FIG. 2, a system 10 according to the present embodiment includes the advertisement server 100, the tablet terminal 200, and the TV 300.

(Advertisement Server)

The advertisement server 100 is a collection of functions that can be achieved with one or multiple server devices in a network. Each of the server devices is achieved with a hardware configuration of an information processing apparatus, which will be described later, for example. The advertisement server 100 includes a first advertisement management part 110, a second advertisement management part 120, a linked display controller 130, and a storage 140. Note that, in the information processing apparatus that is used as the server device, the storage 140 is used as a storage device, and other parts may be used like software with a processor such as a central processing unit (CPU) operating in accordance with a program.

The first advertisement management part 110 manages a display of advertisement content on the tablet terminal 200 serving as a first device. More specifically, the first advertisement management part 110 acquires, from advertisement content 142 stored in the storage 140, advertisement content (first advertisement content) for the tablet terminal 200, and distributes the first advertisement content to the tablet terminal 200. The distributed first advertisement content is displayed on the tablet terminal 200. In this case, the first advertisement management part 110 may extract, in accordance with control performed by the linked display controller 130, content suitable for a display linked with advertisement content displayed on the TV 300 from the advertisement content 142, and may distribute the content as first advertisement content to the tablet terminal 200. The first advertisement management part 110 may also distribute the first advertisement content in accordance with an advertisement acquisition request (GetAd) transmitted from the tablet terminal 200.

Further, the first advertisement management part 110 acquires, from the tablet terminal 200, information (first information) related to a display of advertisement content, and provides the linked display controller 130 with the information. The first information may be, for example, information for notifying that the display of the advertisement content on the tablet terminal 200 has started. Further, the first information may also be information showing an occurrence of a trigger for starting the display of the first advertisement content or for changing the display of the first advertisement content in the tablet terminal 200, such as a predetermined user operation.

The second advertisement management part 120 manages a display of advertisement content on the TV 300 serving as a second device. More specifically, the second advertisement management part 120 acquires, from the advertisement content 142 stored in the storage 140, advertisement content (second advertisement content) for the TV 300, and distributes the second advertisement content to the TV 300. The distributed second advertisement content is displayed on the TV 300. In this case, the second advertisement management part 120 may extract content suitable for a display on the TV 300 from the advertisement content 142. Further, the second advertisement management part 120 may extract, in accordance with control performed by the linked display controller 130, content suitable for a display linked with the tablet terminal 200 from the advertisement content 142, and may distribute the extracted content to the TV 300.

Further, the second advertisement management part 120 controls the display of the advertisement content on the TV 300 in accordance with the control performed by the linked display controller 130. The control by the linked display controller 130 may be performed on the basis of the information acquired by the first advertisement management part 110 from the tablet terminal 200, for example. In accordance with the control, the second advertisement management part 120 starts the display of the advertisement content on the TV 300 and changes the display of the advertisement content on the TV 300, for example. Here, examples of the change of the display of the advertisement content include jumping to a web page, changing in the display area, and starting video display.

Here, the first advertisement content displayed on the tablet terminal 200 and the second advertisement content displayed on the TV 300 are extracted from the same advertisement content 142, and are related to each other. As described above, those pieces of advertisement content may correspond to a same advertisement target, for example. Each of the pieces of advertisement content may include a common part, or may include corresponding different parts. For example, a series of images may be divided and the divided image pieces may be distributed to the tablet terminal 200 and the TV 300.

The linked display controller 130 controls the display of the second advertisement content on the TV 300 through the second advertisement management part 120, on the basis of the first information acquired by the first advertisement management part 110 from the tablet terminal 200 and linked display setting information 144 defining operation of the second advertisement content displayed on the TV 300 in association with the first information. The linked display setting information 144 is information set in advance in association with the advertisement content 142, for example, and may be stored in the storage 140.

In the present embodiment, the linked display setting information 144 may include one or more of the following definitions, for example.

- In the case where a display of advertisement content is started on the tablet terminal 200, a display of advertisement content is also started on the TV 300.
- In the case where a user operation is given to advertisement content displayed on the tablet terminal 200, a display of advertisement content on the TV 300 is changed to a web page of an advertiser (a browser of the TV 300 is activated and causes a user to access a web page of the advertiser).
- In the case where a user operation is given to advertisement content displayed on the tablet terminal 200, a display area of advertisement content on the TV 300 is expanded.
- In the case where a user operation is given to advertisement content displayed on the tablet terminal 200, a display of advertisement content on the TV 300 is changed from a still image to a video.

Further, the linked display controller 130 may perform control such that the first advertisement management part 110 extracts, as the first advertisement content, content suitable for a display linked with the second advertisement content displayed on the TV 300 on the basis of the linked display setting information 144. Accordingly, for example, in the case where the setting is established such that the advertisement content displayed on the TV 300 is changed to a web page of the advertiser by giving a user operation to the advertisement content displayed on the tablet terminal 200, advertisement content including an operation icon displaying "access to web page" may be distributed to the tablet terminal 200.

Note that, although the storage 140 is included in the advertisement server 100 in the present embodiment, the storage 140 may be included in a storage server other than an advertisement server in another embodiment. Further, the storage 140 may not necessarily be used as a single storage device, and may be used as multiple storage devices dispersedly in a network.

(Tablet Terminal)

The tablet terminal 200 is the first device that communicates with the advertisement server 100 through a network. The tablet terminal 200 is achieved with a hardware configuration of an information processing apparatus, which will be described later, for example. The tablet terminal 200 includes a display controller 210, a display part 220, and an operation part 230. Note that, in the information processing apparatus that is used as the tablet terminal 200, the display controller 210 may be used like software with a processor such as a CPU operating in accordance with a program, the display part 220 may be used as a display serving as an output device, and the operation part 230 may be used as a touch panel or the like serving as an input device.

Note that the first device shown as an example of the tablet terminal 200 in the present embodiment may be any device in another embodiment, as long as the device has functions of displaying advertisement content and acquiring an operation given by a user to the advertisement content. Examples of such device include a mobile phone (smartphone), a personal computer, a game console, and a media player.

The display controller 210 acquires advertisement content (first advertisement content) distributed from the advertisement server 100, and causes the display part 220 to display the first advertisement content. In order to acquire the advertisement content from the advertisement server 100, the display controller 210 may transmit an advertisement acquisition request (GetAd). The display controller 210 may temporarily cache the distributed advertisement content in a storage (not shown). Further, the display controller 210 may start the display of the advertisement content on the display part 220 or may change the display of the advertisement content on the display part 220 in accordance with a user operation acquired by the operation part 230. Information of the user operation acquired by the operation part 230 may be transmitted to the advertisement server 100 as the first information.

(TV)

The TV 300 is the second device that communicates with the advertisement server 100 through a network. The TV 300 is achieved with a hardware configuration of an information processing apparatus, which will be described later, for example. The TV 300 includes a display controller 310 and a display part 320. Note that, in the information processing apparatus that is used as the TV 300, the display controller 310 may be used like software with a processor such as a CPU operating in accordance with a program, and the display part 320 may be used as a display serving as an output device.

Note that the second device shown as an example of the TV 300 in the present embodiment may be any device in another embodiment, as long as the device has a function of displaying advertisement content in conjunction with the display on the first device (tablet terminal 200, in this example). Examples of such device include a personal computer, a game console, and a recorder. In the case where the device is a game console or a recorder, the display part 320 may be connected to the device as an external device (such as TV).

The display controller 310 acquires advertisement content (second advertisement content) distributed from the advertisement server 100, and causes the display part 320 to display the second advertisement content. In order to acquire the advertisement content from the advertisement server 100, the display controller 310 may transmit an advertisement acquisition request (GetAd). The display controller 310 may temporarily cache the distributed advertisement content in a storage (not shown). Further, the display controller 310 may start the display of the advertisement content on the display part 320 or may change the display of the advertisement content on the display part 320 in accordance with a control signal transmitted from the advertisement server 100. The control signal transmitted from the advertisement server 100 may be based on the first information acquired from the tablet terminal 200 displaying the first advertisement content. The display of the second advertisement content on the display part 320 is controlled by the control signal, and thus, the display of the advertisement content on the tablet terminal 200 is linked to the display of the advertisement content on the TV 300.

(1-3. Conclusion)

According to the first embodiment of the present disclosure described above, in the case where a user views a TV at home, for example, advertisement content on a tablet terminal being used as a second screen is displayed in conjunction with advertisement content on the TV. For example, in the case where the user interested in advertisement content displayed on the tablet terminal selects the advertisement content, more detailed information is displayed on the TV. According to such a configuration, pieces of advertisement content can be displayed in a combination based on properties of respective devices (the tablet terminal is at hand, but an amount of displayable information is small; the TV is placed far away, but an amount of displayable information is large, and the like) among the multiple devices that are being used by the user, and hence, there can be achieved the distribution of more appealing advertisement content utilizing the properties of the device.

2. Second Embodiment (2-1. Overview)

Figure 3A:
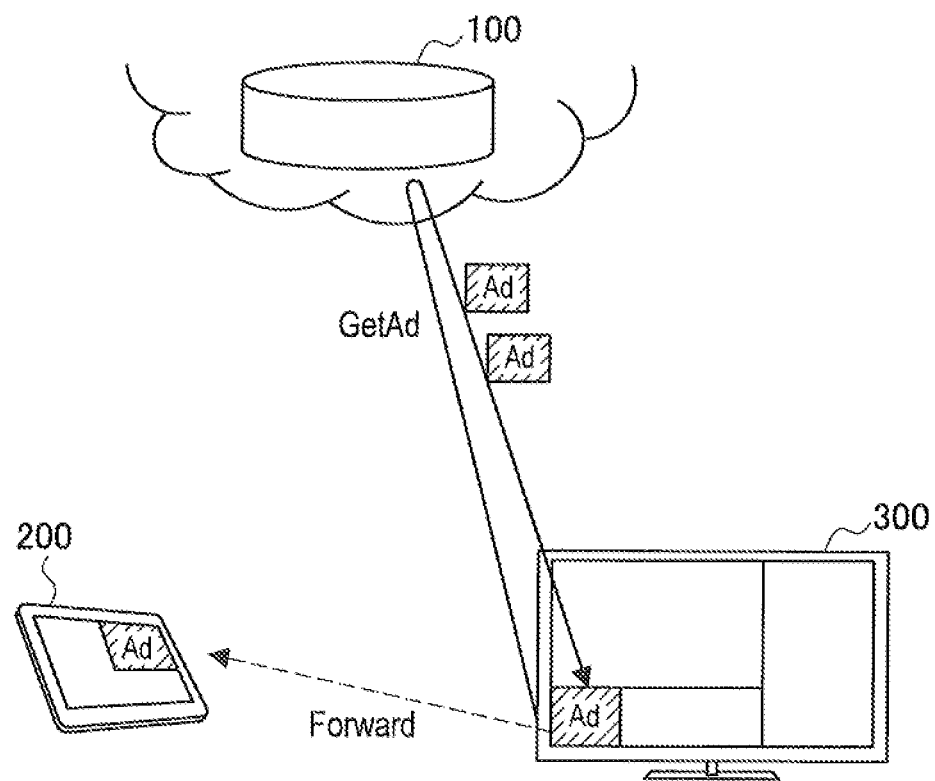
FIG. 3A is a diagram showing a state during advertisement distribution in a second embodiment of the present disclosure.
Figure 3B:
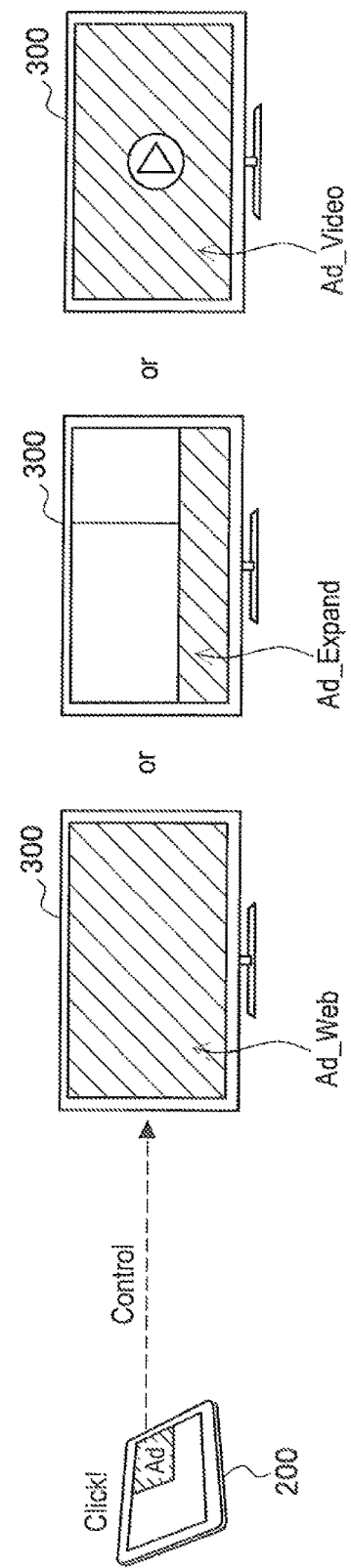
FIG. 3B is a diagram showing a state during advertisement linking in the second embodiment of the present disclosure.

FIG. 3A and FIG. 3B are each a diagram schematically showing a second embodiment of the present disclosure. Note that the figure of the state before advertisement distribution is omitted, as the state is the same as that of the first embodiment. FIG. 3A shows a state during advertisement distribution in the present embodiment. In the case where the TV 300 transmits an advertisement acquisition request (GetAd) to the advertisement server 100, advertisement content (Ad) is distributed to the TV 300. The advertisement acquisition request is transmitted by an advertisement application executed in the TV 300, for example.

Here, in the present embodiment, the TV 300 recognizes that the tablet terminal 200 and the TV 300 are used in cooperation with each other, and acquires, for a linked display to be described later, advertisement content for the tablet terminal 200 and advertisement content for the TV 300 from the advertisement server 100. The TV 300 forwards, out of the pieces of advertisement content acquired from the advertisement server 100, the advertisement content for the tablet terminal 200 to the tablet terminal 200. In the same manner as in the first embodiment, the advertisement content distributed to the TV 300 and the advertisement content forwarded to the tablet terminal 200 are displayed on the respective screens.

FIG. 3B shows a state during advertisement linking in the present embodiment. Also in the present embodiment, in the same manner as in the first embodiment, the tablet terminal 200 and the TV 300 each display advertisement content (Ad), and when a user operation (Click!) is given to the advertisement content in the tablet terminal 200, the display of the advertisement content on the TV 300 changes. The present embodiment is different from the first embodiment in that the tablet terminal 200 directly controls (Control) the display of the advertisement content on the TV 300. The display after the change on the TV 300 is executed on the basis of contents of the display in display areas having different sizes, an address of a web site, video content, and the like. Those pieces of information or data may be included in the advertisement content distributed during the advertisement distribution, or may be additionally acquired from the advertisement server 100 when the TV 300 receives a control signal from the tablet terminal 200.

(2-2. Functional Configuration)

Figure 4:
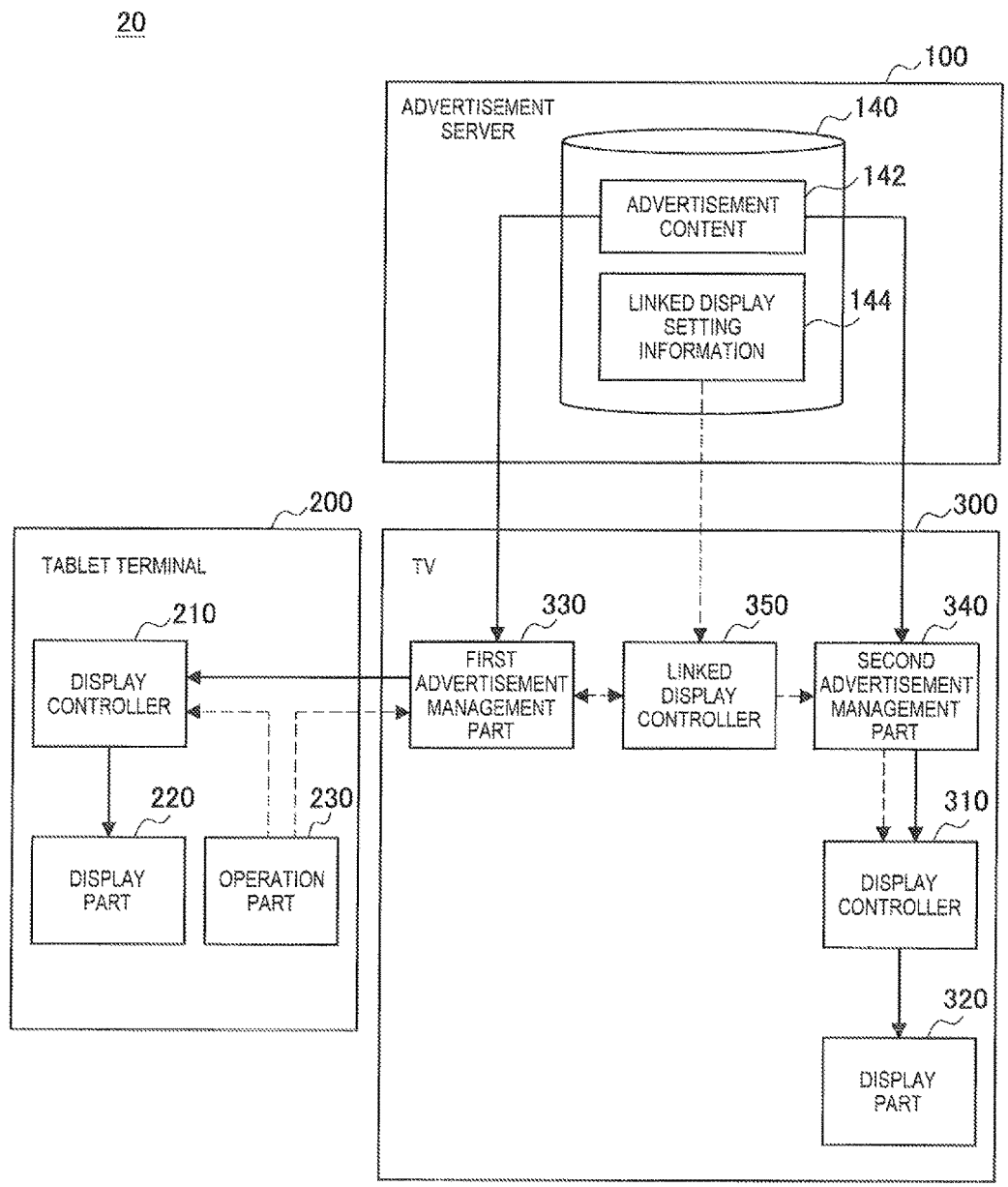
FIG. 4 is a block diagram schematically showing a functional configuration of the second embodiment of the present disclosure.

FIG. 4 is a block diagram schematically showing a functional configuration of the second embodiment of the present disclosure. Referring to FIG. 4, a system 20 according to the present embodiment includes the advertisement server 100, the tablet terminal 200, and the TV 300. The present embodiment is different from the first embodiment in that the TV 300 further includes a first advertisement management part 330, a second advertisement management part 340, and a linked display controller 350. The present embodiment is the same as the first embodiment in functions of the respective parts and is the same in that the parts may be used like software with a processor. Accordingly, the difference of the present embodiment from the first embodiment will be mainly described below and the description of the common parts will be omitted.

The first advertisement management part 330 acquires advertisement content (first advertisement content) for the tablet terminal 200 from the advertisement content 142 stored in the storage 140 of the advertisement server 100 through a network, and forwards the first advertisement content to the tablet terminal 200. Further, the first advertisement management part 330 acquires information (first information) related to a display of advertisement content from the tablet terminal 200, and provides the linked display controller 350 with the information.

The second advertisement management part 340 acquires advertisement content (second advertisement content) for the TV 300 from the advertisement content 142 stored in the storage 140 of the advertisement server 100 through a network, and provides internally the display controller 310 with the second advertisement content. In addition, the second advertisement management part 340 controls the display controller 310, to thereby control internally the display of the advertisement content on the TV 300.

The linked display controller 350 acquires linked display setting information 144 stored in the storage 140 of the advertisement server 100 through a network. The linked display controller 350 may refer to the linked display setting information 144 on a real-time basis in accordance with the first information acquired by the first advertisement management part 330, or may acquire the linked display setting information 144 and cache the linked display setting information 144 in the storage (not shown) in advance.

Here, for example, the first advertisement management part 330, the second advertisement management part 340, and the linked display controller 350 may each transmit in cooperation with each other an advertisement acquisition request (GetAd) to the advertisement server 100. The first advertisement management part 330, the second advertisement management part 340, and the linked display controller 350 may acquire the first advertisement content for the tablet terminal 200, the second advertisement content for the TV 300, and the linked display setting information 144, respectively, from the advertisement server 100.

Note that, in the present specification, "to acquire linked display setting information and pieces of advertisement content from an advertisement server" does not necessarily mean that the linked display setting information and the pieces of advertisement content are acquired from a single device. As described above, the advertisement server 100 according to one or more of embodiments of the present disclosure may be a collection of functions that are achieved with one or multiple server devices in a network. Therefore, the term "server" does not necessarily mean a specific server device. Accordingly, even though there is the description of "to acquire linked display setting information and pieces of advertisement content from a server", the server device for achieving the function of providing the linked display setting information may be different from the server device for achieving the function of providing the pieces of advertisement content.

On the other hand, in the tablet terminal 200, the display controller 210 acquires the first advertisement content forwarded from the TV 300 and causes the display part 220 to display the first advertisement content. In the present embodiment, the first advertisement management part 330 included in the TV 300 may transmit, to the advertisement server 100, an advertisement acquisition request (GetAd) for acquiring the first advertisement content for the tablet terminal 200. The display controller 210 may also be capable of making a request to transmit the advertisement acquisition request or to forward the first advertisement content to the first advertisement management part 330. On the other hand, information such as a user operation acquired by the operation part 230 is provided to the display controller 210 and is also transmitted to the first advertisement management part 330 of the TV 300 as the first information, and may further be forwarded to the advertisement server 100.

Note that, in the present embodiment, the tablet terminal 200 is communicable with the TV 300, but may not be communicable with the advertisement server 100. For example, the tablet terminal 200 may be communicable with the TV 300 using a wireless local area network (LAN), Bluetooth (registered trademark), and the like, but may not be connected to a network such as the Internet for communicating with the advertisement server 100. Accordingly, the tablet terminal 200 may be various types of information terminals shown as examples in the first embodiment, and may also be a device used at home, such as a remote controller.

(2-3. Conclusion)

According to the second embodiment of the present disclosure described above, also in the case where the tablet terminal 200 does not communicate with the advertisement server 100 and communicates mainly with the TV 300, the tablet terminal 200 can achieve the same functions as those of the first embodiment. Accordingly, it becomes possible that the tablet terminal 200 is not only used as an information processing apparatus having a network communication function, but also used as a device such as a remote controller having a function of performing communication within a limited area, such as within a home.

3. Third Embodiment (3-1. Overview)

Figure 5A:
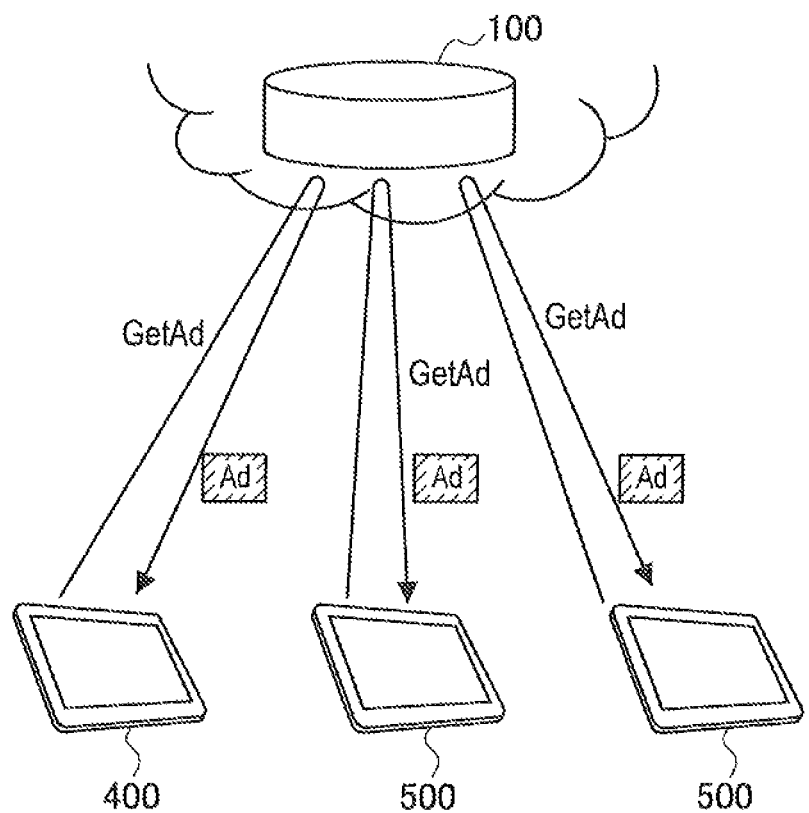
FIG. 5A is a diagram showing a state during advertisement distribution in a third embodiment of the present disclosure.
Figure 5B:
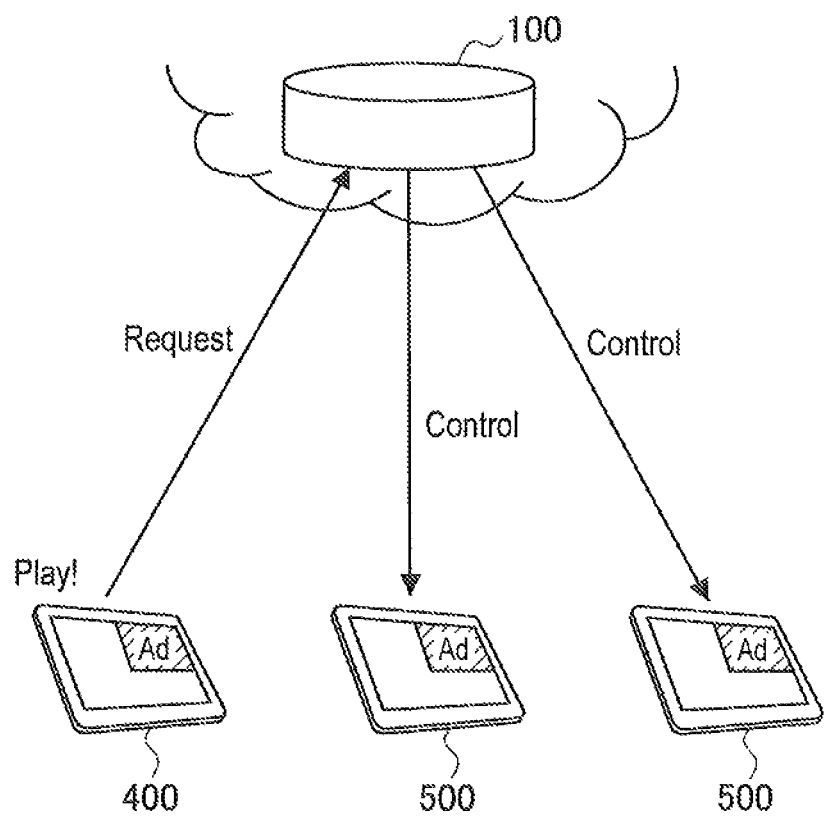
FIG. 5B is a diagram showing a state during advertisement linking in the third embodiment of the present disclosure.

FIG. 5A and FIG. 5B are each a diagram schematically showing a third embodiment of the present disclosure. FIG. 5A shows a state during advertisement distribution in the present embodiment. Here, in the case where a master terminal 400 and slave terminals 500 each transmit an advertisement acquisition request (GetAd) to the advertisement server 100, pieces of advertisement content (Ad) are distributed to the devices, respectively. The advertisement acquisition request is transmitted by an advertisement application executed in common by the master terminal 400 and the slave terminals 500, for example.

Here, the advertisement content (Ad) to be distributed to the master terminal 400 and the pieces of advertisement content (Ad) to be distributed to the slave terminals 500 may correspond to the same advertisement target, for example. The subject items of the pieces of advertisement content may be the same or different from each other. For example, an image in advertisement content may be divided and the divided image pieces may be distributed to the master terminal 400 and the slave terminals 500. In this case, a series of image pieces is displayed over the multiple terminals, which makes it easier for the advertisement to attract user's attention.

Note that, although the figure shows one master terminal 400 and two slave terminals 500, the number of terminals is not limited thereto. For example, the number of the master terminals 400 may be two or more, and the number of the slave terminals 500 may be one, or three or more. For example, in the case where divided pieces of advertisement content are to be distributed to the master terminal 400 and the slave terminals 500, (the linked display controller 130 of) the advertisement server 100 recognizes the number of terminals that are distribution targets, and may determine the number of pieces into which the advertisement content is to be divided depending on the number.

FIG. 5B shows a state during advertisement linking in the present embodiment. In the present embodiment, synchronized with the start of the display of advertisement content (Ad) on the master terminal 400, the display of advertisement content (Ad) on the slave terminal 500 may also be started. Further, synchronized with the change of the display of advertisement content (Ad) on the master terminal 400, the display of the advertisement content (Ad) on the slave terminal 500 may also be changed. Here, the start or the change of the display of the advertisement content on the master terminal 400 may be caused by a user operation given to the master terminal 400, or may be caused by a sensing result such as position information of the master terminal 400 or by a time.

The change of the display of the advertisement content on the slave terminal 500 is achieved as follows: the master terminal 400 transmits an advertisement control request (Request) to the advertisement server 100; and, in response, the advertisement server 100 controls (Control) the display of the advertisement content on the slave terminal 500. Note that the advertisement control request to be transmitted may not necessarily be an explicit request, and may be the contents of the user operation as they are, a sensing result, a time, or the like.

Note that the advertisement distribution and the advertisement linking (display) according to the present embodiment may be continuous or noncontinuous in terms of time. That is, the advertisement may be distributed on a real-time basis during displaying of the advertisement, or may be distributed at a background before displaying the advertisement. In the case where the advertisement distribution is executed on a real-time basis, the fact that the advertisement is distributed to the master terminal 400 may be a trigger for executing the advertisement distribution to the slave terminal 500. In the case where the advertisement distribution is executed in the background, the advertisement distribution to the master terminal 400 and the advertisement distribution to the slave terminal 500 may be executed at different times.

Further, in the present embodiment, the role of the master terminal 400 and the role of the slave terminal 500 are interchangeable. That is, in the case where there are multiple terminals and pieces of advertisement content are distributed to the terminals, respectively, a terminal which has started the display of the advertisement content first may become the master terminal 400, and other terminal(s) may each become the slave terminal 500. The interchanging of the roles may occur also after the start of the display of the advertisement content on each of the terminals.

That is, in the case where the displays of the pieces of advertisement content on the slave terminals 500 are started in conjunctions with the start of the display of the advertisement content on the master terminal 400, when a display of advertisement content on any one of the slave terminals 500 has changed by a user operation, this slave terminal 500 may become the master terminal 400, and the displays of the pieces of advertisement content on the slave terminals 500 including the display of the original master device may be changed in conjunction. Such a link can also be called a two-way link of advertisement content display between the first device and the second device.

(3-2. Functional Configuration)

Figure 6:
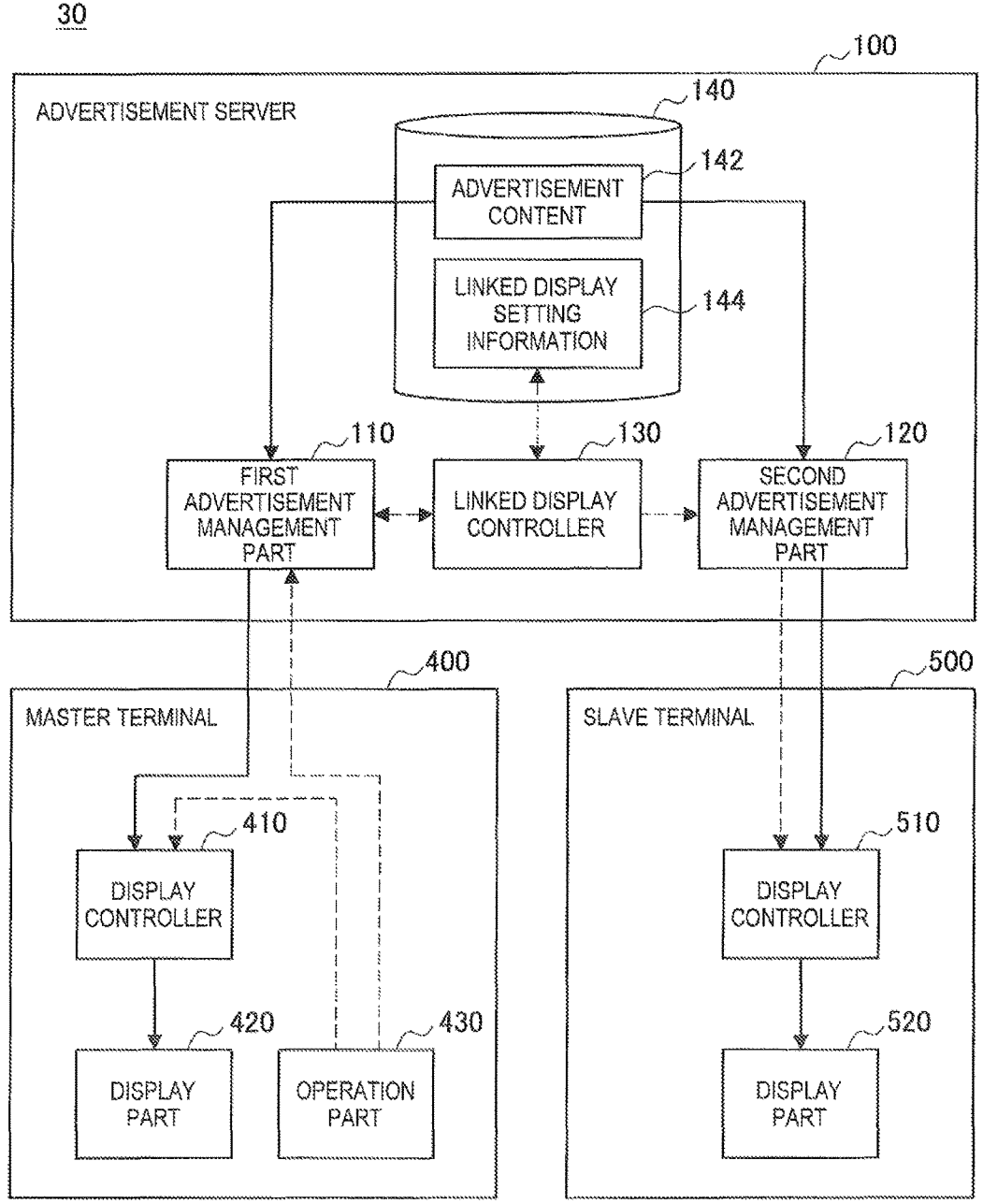
FIG. 6 is a block diagram schematically showing a functional configuration of the third embodiment of the present disclosure.

FIG. 6 is a block diagram schematically showing a functional configuration of the third embodiment of the present disclosure. Referring to FIG. 6, a system 30 according to the present embodiment includes the advertisement server 100, the master terminal 400, and the slave terminal 500. The advertisement server 100 is the same as that of the first embodiment except that the first device is the master terminal 400 and the second device is the slave terminal 500. Accordingly, detailed description will be omitted except for the linked display setting information 144, which will be described later.

(Master Terminal)

The master terminal 400 is the first device that communicates with the advertisement server 100 through a network. The master terminal 400 is a similar device as the tablet terminal 200 of the first embodiment, for example, and is achieved with a hardware configuration of an information processing apparatus, which will be described later. The master terminal 400 includes a display controller 410, a display part 420, and an operation part 430. Note that, in the information processing apparatus that is used as the master terminal 400, the display controller 410 may be used like software with a processor such as a CPU operating in accordance with a program, the display part 420 may be used as a display serving as an output device, and the operation part 430 may be used as a touch panel or the like serving as an input device.

The display controller 410 acquires first advertisement content distributed from the advertisement server 100, and causes the display part 420 to display the first advertisement content. In order to acquire advertisement content from the advertisement server 100, the display controller 410 may transmit an advertisement acquisition request (GetAd). The display controller 410 may temporarily cache the distributed advertisement content in a storage (not shown). Further, the display controller 410 may start the display of the advertisement content on the display part 420 or may change the display of the advertisement content on the display part 420 in accordance with a user operation acquired by the operation part 430. Information of the user operation acquired by the operation part 430 may be transmitted to the advertisement server 100 as the first information.

(Slave Terminal)

The slave terminal 500 is the second device that communicates with the advertisement server 100 through a network. The slave terminal 500 is a similar device as the tablet terminal 200 of the first embodiment, for example, and is achieved with a hardware configuration of an information processing apparatus, which will be described later. The slave terminal 500 includes a display controller 510 and a display part 520. Note that, in the information processing apparatus that is used as the slave terminal 500, the display controller 510 may be used like software with a processor such as a CPU operating in accordance with a program, and the display part 520 may be used as a display serving as an output device.

Note that, as described above, since the role of the master terminal 400 and the role of the slave terminal 500 are interchangeable in the present embodiment, the configuration of the master terminal 400 may be the same as the configuration of the slave terminal 500. That is, the slave terminal 500 may also include an operation part in the same manner as the master terminal 400. However, for simplicity of the description, the structural elements that are not related to the roles of the master terminal 400 and the slave terminal 500 are omitted in the figure, the master terminal 400 and the slave terminal 500 being determined at least temporarily.

Since the present embodiment relates to the linked display of pieces of advertisement content between devices that are different from those of the first and second embodiments, the linked display setting information stored in the storage 140 of the advertisement server 100 may include one or more of the following definitions, which are different from the definitions of the first embodiment, for example. Note that linked display settings using sensing results such as position information, sound, acceleration, a captured image, and the like as first information are usable in the case where an information processing apparatus that is used as the master terminal 400 includes a global positioning system (GPS) sensor, a microphone, an acceleration sensor, an imaging device, and the like.

- In the case where a display of advertisement content is started on the master terminal 400, a display of the same advertisement content is started on the slave terminal 500.
- In the case where a display of advertisement content is changed by a user operation on the master terminal 400, a change corresponding to the change on the master terminal 400 occurs in the advertisement content displayed on the slave terminal 500.
- In the case where an arrival of a predetermined time is detected in the master terminal 400, a display of advertisement content on the master terminal 400 and a display of advertisement content on the slave terminal 500 are started.
- In the case where position information of the master terminal 400 indicates a specific place, a display of advertisement content on the master terminal 400 and a display of advertisement content on the slave terminal 500 are started.
- In the case where position information of the master terminal 400 indicates a specific place, a display of advertisement content on the master terminal 400 and a display of advertisement content on a slave terminal 500 located near the place are started.
- In the case where a specific application or function is activated in the master terminal 400, a display of advertisement content on the master terminal 400 and a display of advertisement content on the slave terminal 500 are started.
- In the case where the master terminal 400 senses specific sound, a display of advertisement content on the master terminal 400 and a display of advertisement content on the slave terminal 500 are started.
- In the case where acceleration of the master terminal 400 exceeds a predetermined value, a display of advertisement content on the master terminal 400 and a display of advertisement content on the slave terminal 500 are started
- In the case where a captured image taken by the master terminal 400 includes a predetermined letter, picture, or expression of a human face, a display of advertisement content on the master terminal 400 and a display of advertisement content on the slave terminal 500 are started.

(3-3. Conclusion)

According to the third embodiment of the present disclosure described above, multiple information terminals carried by people who are friends with each other are caused to function as master terminals and slave terminals, and can share same advertisement content. Further, by starting the display of advertisement content using as a trigger various conditions not limited to a user operation, the sharing of the advertisement content can be started at an unexpected timing, for example. The present embodiment can achieve distribution of more appealing advertisement content using elements such as the sharing with friends and unexpectedness of the situation.

4. Fourth Embodiment (4-1. Overview)

Figure 7A:
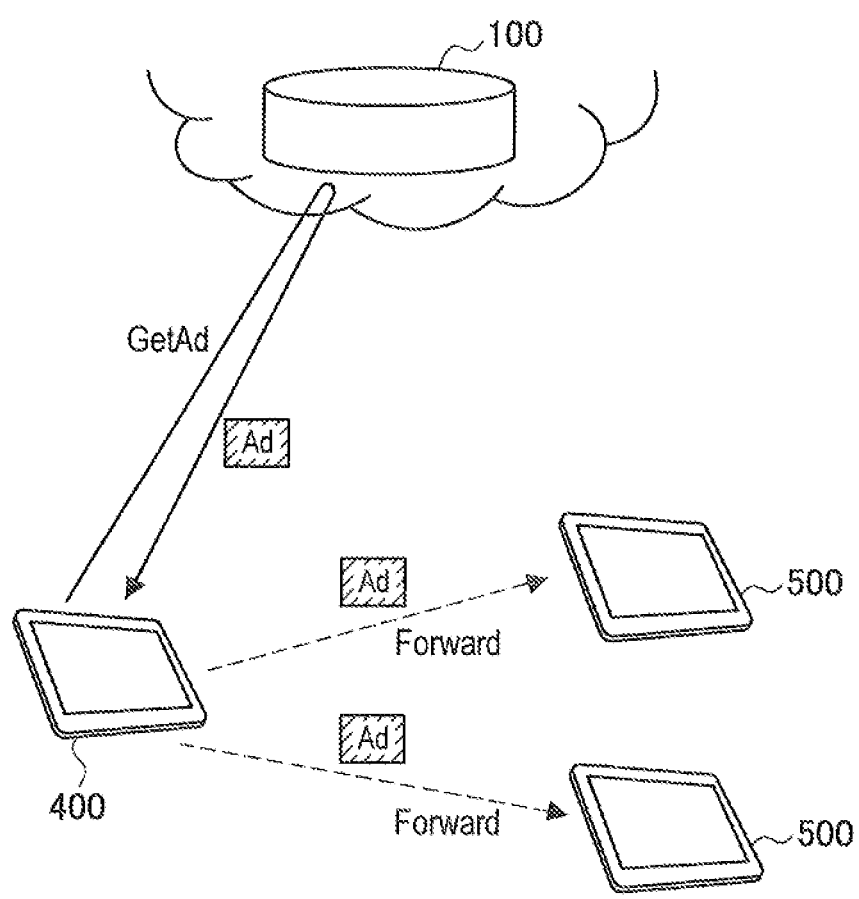
FIG. 7A is a diagram showing a state during advertisement distribution in a fourth embodiment of the present disclosure.
Figure 7B:
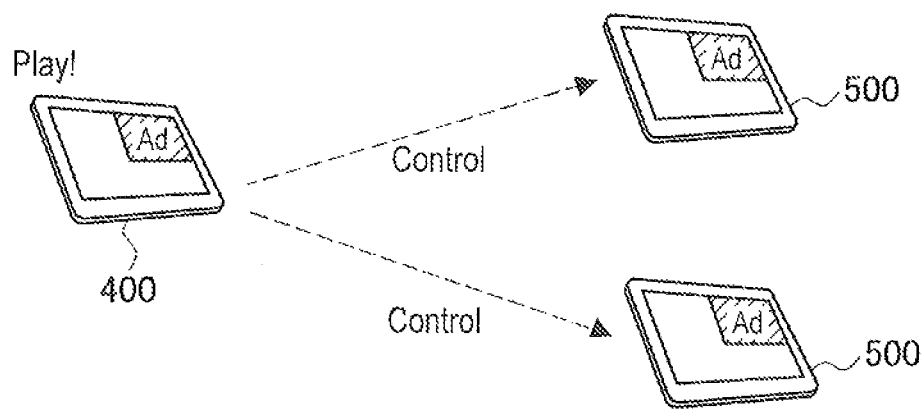
FIG. 7B is a diagram showing a state during advertisement linking in the fourth embodiment of the present disclosure.

FIG. 7A and FIG. 7B are each a diagram schematically showing a fourth embodiment of the present disclosure. FIG. 7A shows a state during advertisement distribution in the present embodiment. In the case where the master terminal 400 transmits an advertisement acquisition request (GetAd) to the advertisement server 100, the advertisement content (Ad) is distributed to the master terminal 400. The advertisement acquisition request is transmitted by an advertisement application executed by the master terminal 400, for example.

Here, in the present embodiment, the master terminal 400 recognizes a slave terminal 500 to be linked with, and for a linked display, which will be described later, advertisement content for the master terminal 400 and advertisement content for the slave terminal 500 are acquired from the advertisement server 100. The master terminal 400 forwards the advertisement content for the slave terminal 500 out of the pieces of advertisement content acquired from the advertisement server 100 to the slave terminal 500. Note that, in the case where the master terminal 400 and the slave terminal 500 are the terminals of an identical type, for example, the master terminal 400 may provide the slave terminal 500 with a copy of the advertisement content acquired from the advertisement server 100.

FIG. 7B shows a state during advertisement linking in the present embodiment. Also in the same manner as in the third embodiment, in the present embodiment, synchronized with the start of the display of advertisement content (Ad) on the master terminal 400, the display of advertisement content (Ad) on the slave terminal 500 may also be started. Further, synchronized with the change of the display of advertisement content (Ad) on the master terminal 400, the display of the advertisement content (Ad) on the slave terminal 500 may also be changed. The present embodiment is different from the third embodiment in that the master terminal 400 directly controls (Control) the display of the advertisement content on the slave terminal 500. The start of display and the change of display of the advertisement content on the master terminal 400 may be caused by a user operation given to the master terminal 400, or may be caused by a sensing result such as position information of the master terminal 400 or by a time. For example, when the master terminal 400 detects such a trigger, the master terminal 400 transmits a control signal to the slave terminal 500, the control signal controlling the slave terminal 500 to operate in the same manner as the master terminal 400.

Note that the advertisement distribution and the advertisement linking (display) according to the present embodiment may also be continuous or noncontinuous in terms of time. That is, the advertisement may be distributed on a real-time basis during displaying of the advertisement, or may be distributed at a background before displaying the advertisement. In the case where the advertisement distribution is executed on a real-time basis, the advertisement is distributed to the master terminal 400, and the advertisement may subsequently be forwarded to the slave terminal 500. In the case where the advertisement distribution is executed in the background, the advertisement distribution to the master terminal 400 and the forwarding to the slave terminal 500 may be executed at different times.

(4-2. Functional Configuration)

Figure 8:
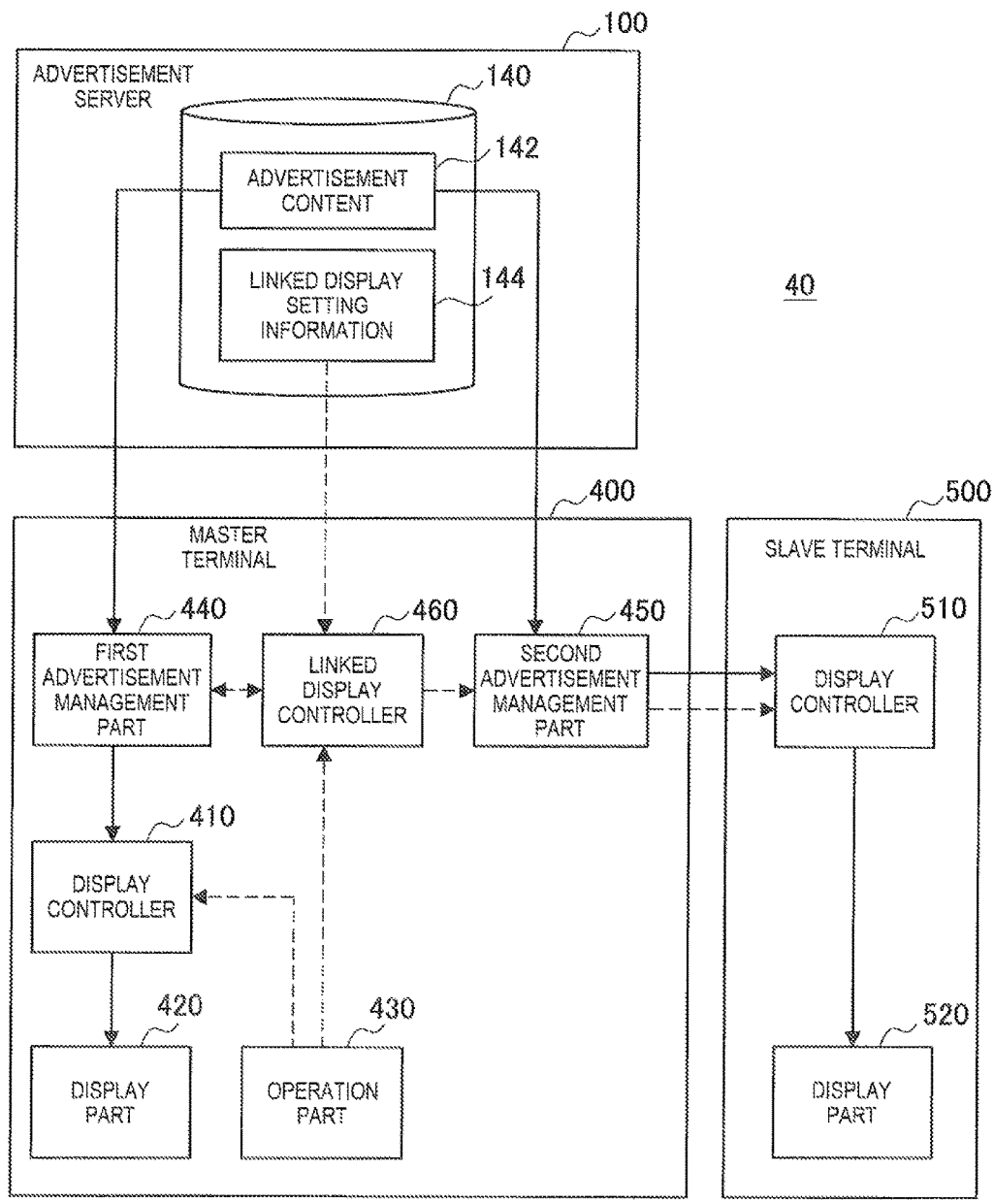
FIG. 8 is a block diagram schematically showing a functional configuration of the fourth embodiment of the present disclosure.

FIG. 8 is a block diagram schematically showing a functional configuration of the fourth embodiment of the present disclosure. Referring to FIG. 8, a system 40 according to the present embodiment includes the advertisement server 100, the master terminal 400, and the slave terminal 500. The present embodiment is different from the third embodiment in that the master terminal 400 includes a first advertisement management part 440, a second advertisement management part 450, and a linked display controller 460. The present embodiment is the same as the third embodiment in functions of the respective parts and is the same in that the parts may be used like software with a processor. Accordingly, the difference of the present embodiment from the third embodiment will be mainly described below and the description of the common parts will be omitted.

The first advertisement management part 440 acquires advertisement content (first advertisement content) for the master terminal 400 from the advertisement content 142 stored in the storage 140 of the advertisement server 100 through a network, and provides internally the display controller 410 with the first advertisement content. Further, the first advertisement management part 440 acquires internally information (first information) related to a display of the first advertisement content and acquired by the operation part 430 and the like, and provides the linked display controller 460 with the information.

The second advertisement management part 450 acquires advertisement content (second advertisement content) for the slave terminal 500 from the advertisement content 142 stored in the storage 140 of the advertisement server 100 through a network, and forwards the second advertisement content to the slave terminal 500. Further, the second advertisement management part 450 transmits a control signal to the slave terminal 500 in accordance with control performed by the linked display controller 460, and thus, the display of the second advertisement content on the slave terminal 500 is controlled.

The linked display controller 460 acquires linked display setting information 144 stored in the storage 140 of the advertisement server 100 through a network. The linked display controller 460 may refer to the linked display setting information 144 on a real-time basis in accordance with the first information provided by the operation part 430 or the like, or may acquire the linked display setting information 144 and cache the linked display setting information 144 in the storage (not shown) in advance.

Here, for example, the first advertisement management part 440, the second advertisement management part 450, and the linked display controller 460 may each transmit in cooperation with each other an advertisement acquisition request (GetAd) to the advertisement server 100. The first advertisement management part 440, the second advertisement management part 450, and the linked display controller 460 may acquire the first advertisement content for the master terminal 400, the second advertisement content for the slave terminal 500, and the linked display setting information 144, respectively, from the advertisement server 100.

On the other hand, in the slave terminal 500, the display controller 510 acquires the second advertisement content forwarded from the master terminal 400, and causes the display part 520 to display the second advertisement content. In the present embodiment, the second advertisement management part 450 included in the master terminal 400 may transmit, to the advertisement server 100, an advertisement acquisition request (GetAd) for acquiring the advertisement content for the slave terminal 500. The display controller 510 may also be capable of making a request to transmit the advertisement acquisition request or to forward the second advertisement content to the second advertisement management part 450.

Note that, in the present embodiment, the slave terminal 500 is communicable with the master terminal 400, but may not be communicable with the advertisement server 100. For example, the slave terminal 500 may be communicable with the master terminal 400 using a wireless LAN, Bluetooth (registered trademark), and the like, but may not be connected to a network such as the Internet for communicating with the advertisement server 100. Such a state may be stationary or may be temporary. For example, when the master terminal 400 is in a state of being connected to the network at a point of distributing advertisement content shown in FIG. 7A and then is in an off-line state after that, and when the master terminal 400 approaches the slave terminal 500 which is also in an off-line state, the forwarding of the advertisement content to the slave terminal 500 may be executed. In this case, in addition, if the linked display controller 460 acquires the linked display setting information 144 and caches the linked display setting information 144 in the storage (not shown) during advertisement distribution, it becomes possible to execute a linked display of advertisement content even in the case where the master terminal 400 and the slave terminal 500 are both in off-line states and are in a state in which the master terminal 400 and the slave terminal 500 are able to communicate only with each other.

Note that, also in the present embodiment, the role of the master terminal 400 and the role of the slave terminal 500 are interchangeable in the same manner as in the third embodiment, and hence, the slave terminal 500 may also include a first advertisement management part, a second advertisement management part, a linked display controller, and an operation part, in the same manner as the master terminal 400. However, for simplicity of the description, the structural elements that are not related to the roles of the master terminal 400 and the slave terminal 500 are omitted in the figure, the master terminal 400 and the slave terminal 500 being determined at least temporarily.

(4-3. Conclusion)

According to the fourth embodiment of the present disclosure described above, even in the case where the slave terminal 500 does not communicate with the advertisement server 100 and communicates mainly with the master terminal 400, the slave terminal 500 can achieve the same functions as those of the third embodiment. Also, the master terminal 400 does not have to communicate with the advertisement server 100 except during advertisement distribution. Accordingly, it becomes possible to achieve a linked display of advertisement content between devices even in the case where it is difficult to execute communication with the advertisement server 100, as long as the devices are able to communicate with each other.

5. Fifth Embodiment

Figure 9:
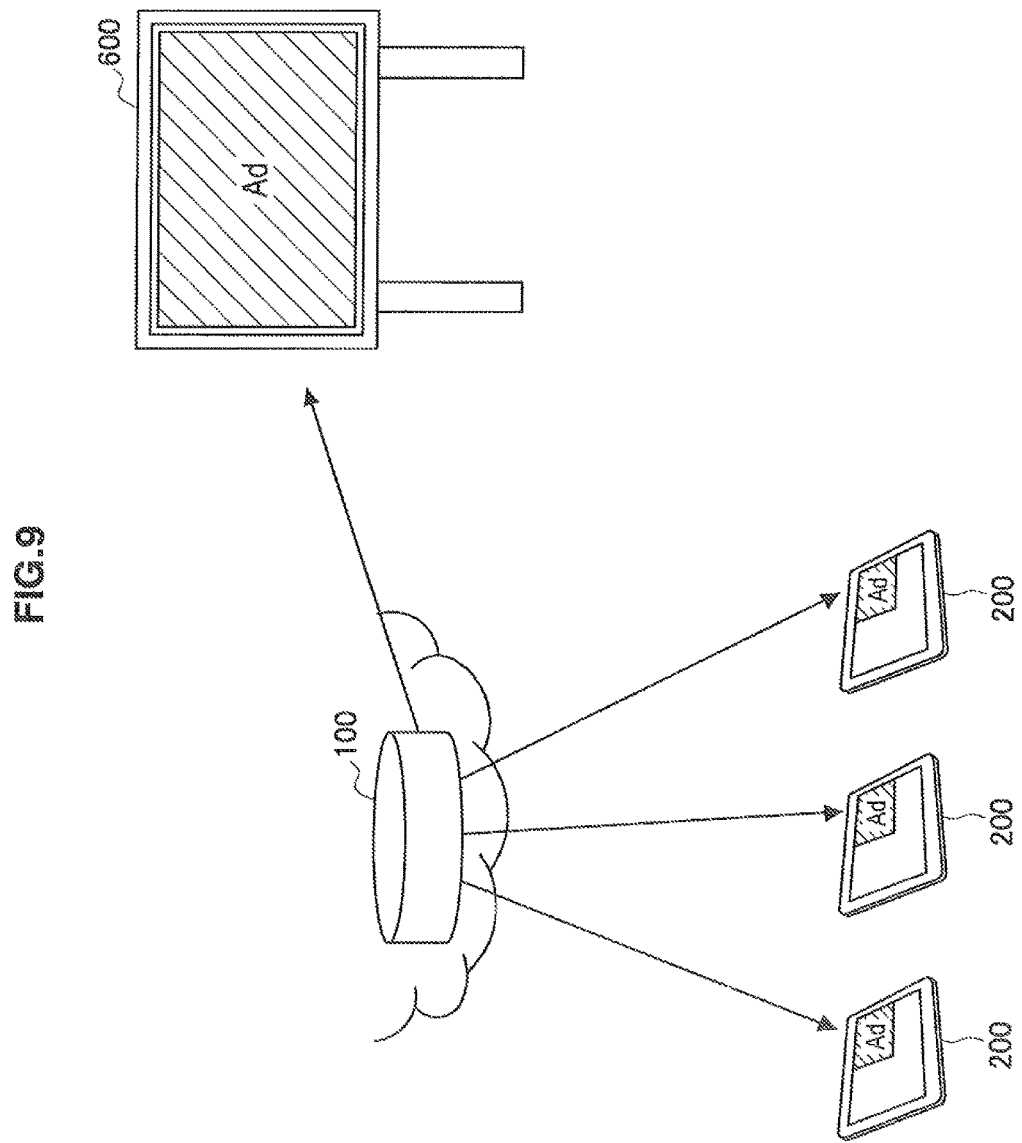
FIG. 9 is a diagram showing a state during advertisement linking in a fifth embodiment of the present disclosure.

FIG. 9 is a diagram schematically showing a fifth embodiment of the present disclosure. FIG. 9 shows a state during advertisement linking in the present embodiment. In the present embodiment, the advertisement server 100 distributes advertisement content corresponding to advertisement content (Ad) displayed on an electronic bill board 600 to the tablet terminal 200 located near the electronic bill board 600. The fact that the tablet terminal 200 is located near the electronic bill board 600 may be determined on the basis that the tablet terminal 200 becomes communicable with a radio station installed near the electronic bill board 600 or on the basis of position information acquired using a GPS and the like by the tablet terminal 200. The advertisement server 100 changes the display of the advertisement content (Ad) displayed on the electronic bill board 600 on the basis of the number of tablet terminals 200 that have distributed advertisement content, user operations given to the pieces of advertisement content on the respective tablet terminals 200, and the like.

Figure 10:
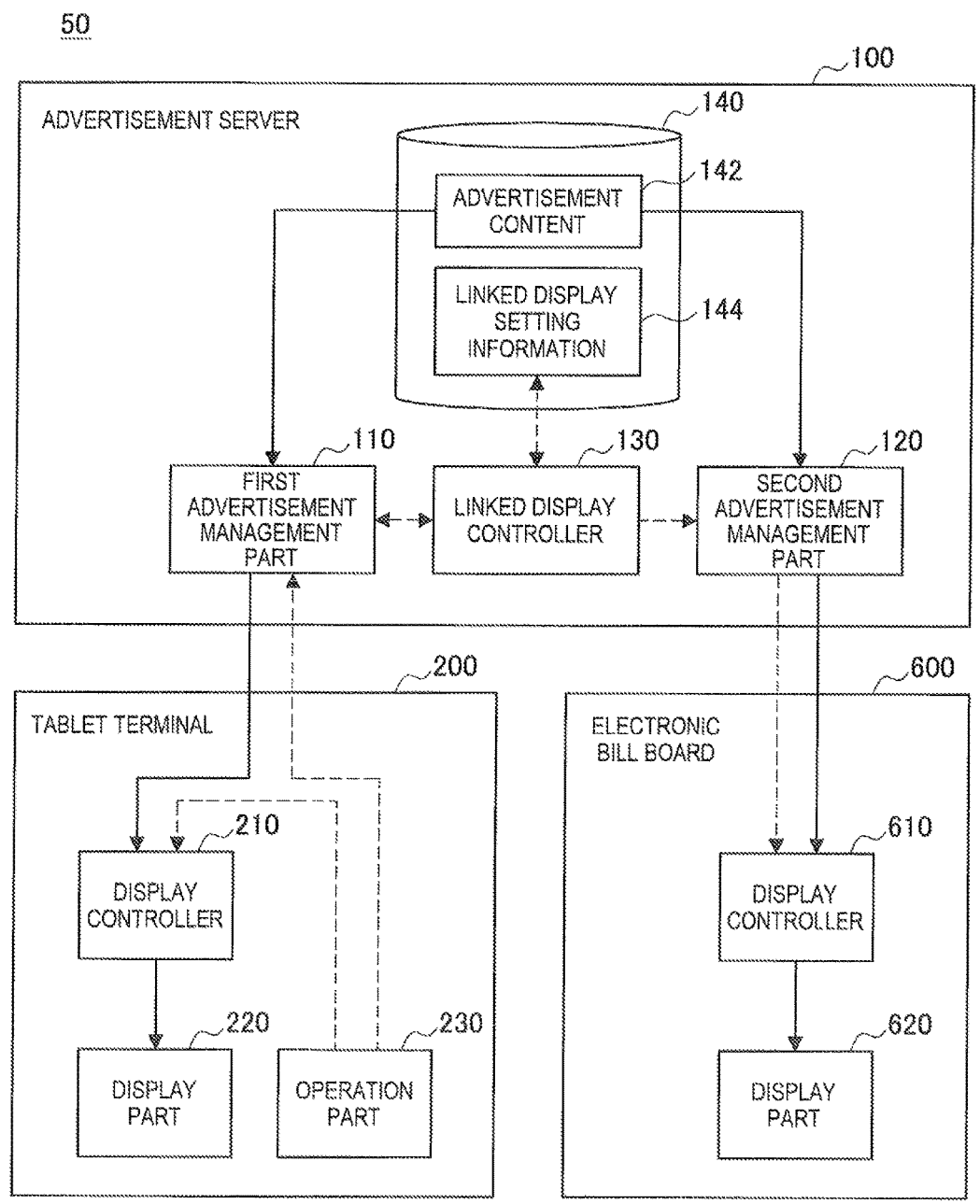
FIG. 10 is a block diagram schematically showing a functional configuration of the fifth embodiment of the present disclosure.

FIG. 10 is a block diagram schematically showing a functional configuration of the fifth embodiment of the present disclosure. Referring to FIG. 10, a system 50 according to the present embodiment includes the advertisement server 100, the tablet terminal 200, and the electronic bill board 600. The advertisement server 100 and the tablet terminal 200 are the same as those of the first embodiment except that the second device is the electronic bill board 600. Accordingly, detailed description will be omitted except for the linked display setting information 144, which will be described later.

The electronic bill board 600 is a large-sized display device in a street, for example, and may be used for displaying mainly an advertisement. The electronic bill board 600 is the second device that communicates with the advertisement server 100 through a network. Alternatively, the electronic bill board 600 may be provided in an integrated manner with the advertisement server 100. The electronic bill board 600 is achieved with a hardware configuration of an information processing apparatus, which will be described later, for example (a device can be referred to as information processing apparatus in the case where a display, which is an output device, has a large size and includes a processor such as a CPU for the control part). The electronic bill board 600 includes a display controller 610 and a display part 620. Note that, in the information processing apparatus that is used as the electronic bill board 600, the display controller 610 may be used like software with a processor such as a CPU operating in accordance with a program, and the display part 620 may be used as a display serving as an output device.

Since the present embodiment relates to the linked display of pieces of advertisement content between devices that are different from those of the first to fourth embodiments, the linked display setting information stored in the storage 140 of the advertisement server 100 may include one or more of the following definitions, which are different from the definitions of the first to fourth embodiments, for example. Note that linked display settings using position information as the first information is usable in the case where an information processing apparatus that is used as the tablet terminal 200 includes a GPS sensor and the like.

- In the case where the tablet terminal 200 comes near to the electronic bill board 600, a display of advertisement content related to advertisement content displayed on the electronic bill board 600 is started on the tablet terminal 200.
- In the case where the number of tablet terminals 200 displaying advertisement content is more than or equal to a predetermined number, a display of advertisement content on the electronic bill board 600 is changed.
- In the case where the number of tablet terminals 200 on which a predetermined user operation is given to the displayed advertisement content is more than or equal to a predetermined number, the display of the advertisement content on the electronic bill board 600 is changed.

Here, the change of the display of the advertisement content on the electronic bill board 600 may be that a still image starts to move as a video, that displayed scenes are switched, and the like. For example, the display of the advertisement content on the electronic bill board 600 is changed, using the following as conditions: users, the number of which being more than or equal to a predetermined number, are gathered and display pieces of advertisement content on the tablet terminals 200; and users, the number of which being more than or equal to a predetermined number, further perform predetermined operations to the pieces of advertisement content displayed on the tablet terminals 200. Thus, the feeling that the gathered users work together and change the display of the advertisement content on the electronic bill board 600 can be obtained, which makes it easy for the advertisement to remain in the users' impressions.

6. Hardware Configuration

Figure 11:
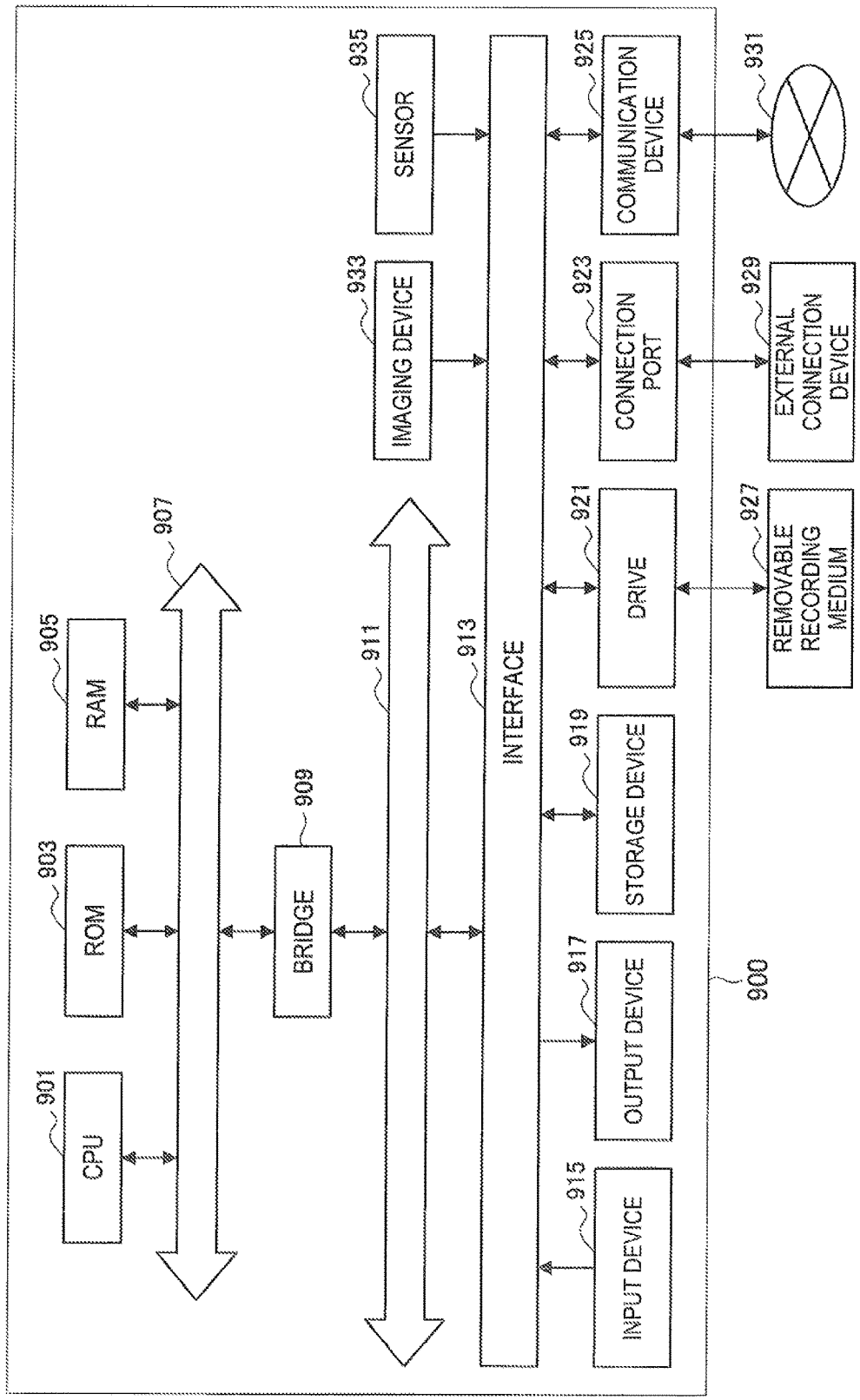
FIG. 11 is a block diagram illustrating a hardware configuration of an information processing apparatus.

Next, with reference to FIG. 11, a hardware configuration of an information processing apparatus according to one or more of embodiments of the present disclosure will be described. FIG. 11 is a block diagram illustrating a hardware configuration of an information processing apparatus. An information processing apparatus 900 shown in the figure may be used as the server device, the tablet terminal, the TV, the master terminal, the slave terminal, and the electronic bill board according to the above embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. In addition, the information processing apparatus 900 may also include an imaging device 933 and a sensor 935 as necessary. The information processing apparatus 900 may also include a processing circuit such as a digital signal processor (DSP) instead of or along with the CPU 901.

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected with each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch and a lever. Also, the input device 915 may be a remote control device using, for example, infrared light or other radio waves, or may be an external connection device 929 such as a mobile phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker and headphones; or a printer. The output device 917 outputs results obtained by the processing performed by the information processing apparatus 900 as video in the form of text or an image or as audio in the form of audio or sound.

The storage device 919 is a device for storing data configured as an example of a storage of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a predetermined protocol such as TCP/IP on the Internet and with other communication devices, for example. The communication network 931 connected to the communication device 925 is configured from a network and the like, which is connected via wire or wirelessly, and is, for example, the Internet, a home-use LAN, infrared communication, radio wave communication, and satellite communication.

The imaging device 933 is a device that images real space using various members including an image sensor such as a charge coupled device (CCD) or a complementary metal oxide semiconductor (CMOS), a lens for controlling image formation of a subject on the image sensor, and the like, and that generates a captured image. The imaging device 933 may image a still image or may image a video.

The sensor 935 is, for example, an acceleration sensor, a gyro sensor, a geomagnetic sensor, an optical sensor, or an audio sensor. The sensor 935 acquires, for example, information related to a state of the information processing apparatus 900 itself, such as the attitude of the housing the information processing apparatus 900, and information related to an ambient environment of the information processing apparatus 900 such as the brightness and noise of the surroundings of the information processing apparatus 900. Further, the sensor 935 may include a GPS sensor that receives global positioning system (GPS) signals and measures latitude, longitude, and altitude of the apparatus.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

7. Supplement

The embodiments of the present disclosure may include the information processing apparatus, the system, the information processing method executed in the information processing apparatus or the system, the program for causing the information processing apparatus to function, and the non-transitory tangible media having the program recorded thereon, which have been described above, for example.

Further, in the description of the above embodiments, the block diagrams of functional configurations merely show the functional configurations for achieving the functions according to the embodiments of the present disclosure. The respective devices may further include other functional configurations for achieving other functions. Further, the functional configurations for achieving the functions according to the embodiments of the present disclosure may also be used for achieving other functions of each of the devices.

Further, although the display of an image is exemplified as a method of outputting advertisement content in the description of the above embodiments, the embodiments of the present disclosure are not limited thereto. For example, the advertisement content may be output as audio, or may be output as a motion of a device, such as vibration. The linking of outputs of pieces of advertisement content is not limited to the linking of the same output mode (for example, between images and between audios), and the linking may be achieved between different output modes (for example, image and audio, image and vibration, and audio and vibration).

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
a first advertisement management part configured to manage an output of first advertisement content from a first device;
a second advertisement management part configured to manage an output of second advertisement content from a second device, the second device being different from the first device, the second advertisement content being related to the first advertisement content; and
a linked output controller configured to control, based on first information acquired by the first advertisement management part from the first device and linked output setting information defining an operation of the second advertisement content in association with the first information, the output of the second advertisement content from the second device through the second advertisement management part.

(2) The information processing apparatus according to (1),
wherein the first information includes information showing an occurrence of a trigger for starting or changing the output of the first advertisement content from the first device.

(3) The information processing apparatus according to (2),
wherein the first information includes information showing a user operation acquired in the first device.

(4) The information processing apparatus according to (2) or (3),
wherein the first information includes information showing a sensing result in the first device.

(5) The information processing apparatus according to any one of (2) to (4),
wherein, when the first information is acquired, the linked output controller causes the output of the second advertisement content from the second device to be started.

(6) The information processing apparatus according to any one of (2) to (5),
wherein, when the first information is acquired, the linked output controller causes the output of the second advertisement content from the second device to be changed.

(7) The information processing apparatus according to (6),
wherein the second advertisement management part manages a display of the second advertisement content on the second device, and
wherein, when the first information is acquired, the linked output controller switches the display of the second advertisement content on the second device from a still image to a video.

(8) The information processing apparatus according to (6) or (7),
wherein the second advertisement management part manages a display of the second advertisement content on the second device, and
wherein, when the first information is acquired, the linked output controller changes a display area of the second advertisement content in the second device.

(9) The information processing apparatus according to any one of (1) to (8),
wherein the linked output controller acquires the linked output setting information from an external device.

(10) The information processing apparatus according to (9),
wherein the first advertisement management part acquires the first advertisement content from the external device, and
wherein the second advertisement management part acquires the second advertisement content from the external device.

(11) The information processing apparatus according to (10), further including
an output controller configured to cause the second advertisement content to be output from an output part of the second device included in the information processing apparatus,
wherein the first advertisement management part forwards the first advertisement content to the first device and also receives the first information from the first device, and
wherein the second advertisement management part provides the output controller with the second advertisement content.

(12) The information processing apparatus according to (10), further including
an output controller configured to cause the first advertisement content to be output from an output part of the first device included in the information processing apparatus,
wherein the first advertisement management part provides the output controller with the first advertisement content and also acquires internally the first information, and
wherein the second advertisement management part forwards the second advertisement content to the second device, and also transmits, to the second device, a control signal for controlling the output of the second advertisement content.

(13) The information processing apparatus according to any one of (1) to (12),
wherein the first information includes information showing that the first device which is portable has come close to the second device, and
wherein, when the first information is acquired, the first advertisement management part causes the output of the first advertisement content from the first device to be started.

(14) The information processing apparatus according to (13),
wherein, when the first information shows that a number of the first devices having come close to the second device and outputting the first advertisement content is more than or equal to a predetermined number, the linked output controller causes the output of the second advertisement content from the second device to be changed.

(15) The information processing apparatus according to (13) or (14), wherein the first information further includes information showing a predetermined user operation acquired in the first device from which the first advertisement content is output, and wherein, when the first information shows that a number of the first devices having acquired the predetermined user operation is more than or equal to a predetermined number, the linked output controller causes the output of the second advertisement content from the second device to be changed.

(16) The information processing apparatus according to any one of (1) to (15), wherein the first advertisement content and the second advertisement content are generated by dividing a series of advertisement content, and wherein the linked output controller determines a number of pieces into which the series of advertisement content is to be divided depending on a number of the first devices and a number of the second devices.

(17) An information processing method including:

managing an output of first advertisement content from a first device;

managing an output of second advertisement content from a second device, the second device being different from the first device, the second advertisement content being related to the first advertisement content; and controlling, based on first information acquired from the first device and linked output setting information defining an operation of the second advertisement content in association with the first information, the output of the second advertisement content from the second device.

(18) A program for causing a computer to achieve a function of managing an output of first advertisement content from a first device, a function of managing an output of second advertisement content from a second device, the second device being different from the first device, the second advertisement content being related to the first advertisement content, and a function of controlling, based on first information acquired from the first device and linked output setting information defining an operation of the second advertisement content in association with the first information, the output of the second advertisement content from the second device.

What is claimed is:

1. An information processing apparatus, comprising:
a communication device configured to communicate with a first device and a second device via a network, wherein the second device is different from the first device; and
one or more processors configured to:
receive a request for first content from the first device via the network;
transmit the first content to the first device via the network, wherein the first content is transmitted based on the received request;
control an output of the first content from the first device;
acquire first information from the first device, wherein the first information is related to the output of the first content from the first device;
extract second content to be output from the second device,
wherein the second content is related to the first content and the second content is extracted from a storage device associated with the information processing apparatus;
acquire linked output setting information from the storage device, wherein the linked output setting information defines an operation of the second content in association with the first information; and
control, based on the first information and the acquired linked output setting information, the output of the second content from the second device,
wherein the output of the second content from the second device is changed based on the first information that indicates that a first number of first devices that output the first content is more than or equal to a second number.

2. The information processing apparatus according to claim 1, wherein the first information includes information that indicates a user operation acquired in the first device.

3. The information processing apparatus according to claim 1, wherein the one or more processors are further configured to initiate the output of the second content from the second device based on the acquisition of the first information.

4. The information processing apparatus according to claim 1,
wherein the one or more processors are further configured to:
control a display of the second content on the second device; and
switch the display of the second content on the second device from a still image to a video based on the acquisition of the first information.

5. The information processing apparatus according to claim 1,
wherein the one or more processors are further configured to:
control a display of the second content on the second device; and
change a display area of the second content in the second device based on the acquisition of the first information.

6. The information processing apparatus according to claim 1,
wherein the one or more processors are further configured to:
acquire the first content from the storage device; and
acquire the second content from the storage device.

7. The information processing apparatus according to claim 1,
wherein the one or more processors are further configured to:
output the second content from an output part of the second device.

8. The information processing apparatus according to claim 1,
wherein the one or more processors are further configured to:
output the first content from an output part of the first device;
acquire internally the first information;
forward the second content to the second device; and
transmit, to the second device, a control signal to control the output of the second content.

9. The information processing apparatus according to claim 1, wherein the first information includes information that indicates that the first device, which is portable, is within a determined distance from the second device, and wherein the one or more processors are further configured to initiate the output of the first content from the first device based on the acquisition of the first information.

10. The information processing apparatus according to claim 1, wherein the first information further includes information that indicates a user operation acquired in the first device from which the first content is output, and wherein the one or more processors are further configured to change the output of the second content from the second device based on the first information that indicates that a third number of the first devices that have acquired the user operation is more than or equal to a fourth number.

11. The information processing apparatus according to claim 1, wherein the first content and the second content are generated based on division of a series of third content, and wherein the one or more processors are further configured to determine a number of pieces into which the series of third content is to be divided, wherein the number of pieces is determined based on a number of the first devices and a number of the second devices.

12. The information processing apparatus according to claim 1, wherein the one or more processors are further configured to start a display of the first content on the first device and a display of the second content on the second device based on an acceleration of the first device that exceeds a particular value.

13. The information processing apparatus according to claim 1, wherein the one or more processors are further configured to start a display of the first content on the first device and a display of the second content on the second device based on an image captured by the first device, wherein the captured image includes at least one of a particular letter, a picture, or an expression of a human face.

14. An information processing method, comprising:
receiving, by an information processing apparatus, a request for first content, wherein the request is received from a first device via a network;
transmitting, by the information processing apparatus, the first content to the first device via the network, wherein the first content is transmitted based on the received request;
controlling, by the information processing apparatus, an output of the first content from the first device;
acquiring, by the information processing apparatus, first information from the first device, wherein the first information is related to the output of the first content from the first device;
extracting, by the information processing apparatus, second content to be output from a second device,
wherein the second device is different from the first device, the second content is related to the first content, and the second content is extracted from a storage device associated with the information processing apparatus;
acquiring, by the information processing apparatus, linked output setting information, wherein the linked output setting information is acquired from the storage device, and wherein the linked output setting information defines an operation of the second content in association with the first information; and
controlling, by the information processing apparatus, the output of the second content from the second device, wherein the output of the second content from the second device is controlled based on the first information and the linked output setting information,
and wherein the output of the second content from the second device is changed based on the first information that indicates that a first number of first devices that output the first content is more than or equal to a second number.

15. A non-transitory computer-readable medium having stored thereon computer-readable instructions, which when executed by a computer, cause the computer to execute operations, the operations comprising:
receiving a request for first content from a first device via a network;
transmitting the first content to the first device via the network, wherein the first content is transmitted based on the received request;
controlling an output of the first content from the first device;
acquiring first information from the first device, wherein the first information is related to the output of the first content from the first device;
extracting second content to be output from a second device,
wherein the second device is different from the first device, the second content is related to the first content, and the second content is extracted from a storage device;
acquiring linked output setting information from the storage device, wherein the linked output setting information defines an operation of the second content in association with the first information; and
controlling, based on the first information and the linked output setting information, the output of the second content from the second device,
wherein the output of the second content from the second device is changed based on the first information that indicates that a first number of first devices that output the first content is more than or equal to a second number.

* * * * *